(12) United States Patent
Jung

(10) Patent No.: US 6,311,811 B1
(45) Date of Patent: Nov. 6, 2001

(54) PNEUMATIC TYPE OF STABILIZER FOR AN AUTOMOBILE

(75) Inventor: Joon Chai Jung, Junjoo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/444,453

(22) Filed: Nov. 22, 1999

(30) Foreign Application Priority Data

Sep. 20, 1999 (KR) .................................................. 99-40440

(51) Int. Cl.$^7$ ................................................. B60G 21/73
(52) U.S. Cl. .................... 188/306; 188/322.19; 188/290; 280/124.106
(58) Field of Search ........................ 188/322.19, 322.21, 188/290, 293, 296, 306; 280/124.106, 124.149, 124.166, 124.13

(56) References Cited

U.S. PATENT DOCUMENTS

| | | | | |
|---|---|---|---|---|
| 2,865,031 | * | 12/1958 | Maloney ........................ | 280/124.106 |
| 5,305,858 | * | 4/1994 | Haga et al. ........................... | 188/271 |
| 5,988,329 | * | 11/1999 | Evans, Jr. et al. ................... | 188/296 |
| 6,135,364 | * | 10/2000 | Nickish ........................... | 239/222.17 |
| 6,173,822 | * | 1/2001 | Korb et al. ........................... | 188/307 |

FOREIGN PATENT DOCUMENTS

| | | | | |
|---|---|---|---|---|
| 764417 | * | 5/1934 | (FR) ........................................ | 188/89 |
| 11049 | * | 5/1910 | (GB) ................................... | 188/306 |
| 3-186424 | * | 8/1991 | (JP) .............................. | 280/124.106 |
| 3-199731 | * | 8/1991 | (JP) ..................................... | 188/307 |
| 5-52228 | * | 3/1993 | (JP) ..................................... | 188/307 |

* cited by examiner

Primary Examiner—Robert J. Oberleitner
Assistant Examiner—Xuan Lan Nguyen
(74) Attorney, Agent, or Firm—Birch, Stewart, Kolasch & Birch, LLP

(57) ABSTRACT

A pneumatic type of stabilizer for an automobile uses pressurized air as an elastic means of the stabilizer. The stabilizer comprises a cylindrical case in which a left rotating rod and a right rotating rod, each having a radial blade, respectively, are pivotally mounted, a rotator connected with an outer end of the rotating rods and protrudes out of the cylindrical case, a connecting rod connected with the ends of the rotators, and two arms connecting the connecting rods with two suspension arms of a suspension system.

3 Claims, 2 Drawing Sheets

PNEUMATIC TYPE OF STABILIZER FOR AN AUTOMOBILE

BACKGROUND OF THE INVENTION

Field of the Invention

The present invention relates to a stabilizer for an automobile, more particularly a pneumatic type of stabilizer for an automobile, which uses the elastic force of the compressed air as an elastic means and can be used in every kind of automobile.

Generally, all kind of automobile has a suspension system in order to get a good ride quality when a passenger rides on an automobile. Then if the suspension system equips a spring having a low spring constant, when the automobile drives on the corner, the spring mounted on the suspension system of the inner side wheel in the automobile is much compressed by the centrifugal force. Therefore the automobile is much tilted and the passenger of the automobile gets a bad ride quality.

In order to solve the above problems, a stabilizer is mounted on the suspension system that returns the body of the automobile to the original position and keeps balance the body of the automobile in equilibrium, when the automobile drives on the corner. Both ends of the stabilizer are respectively connected with a left suspension arm and a right suspension arm of the suspension system, and the center portion of the stabilizer is supported on the frame of the automobile.

The stabilizer itself has a twist elasticity, which does not be applied to the suspension system when both of the left wheel and the right wheel are simultaneously moved upward or downward. But the left wheel and the right wheel are differently moved upward or downward each other, for example when the automobile turns the corner and tilted toward a side, the twist elasticity of the stabilizer is applied to the suspension system and keeps the body of the automobile in equilibrium.

Then the prior traditional stabilizer is a static type. The static type of the stabilizer has some problems.

The prior stabilizer cannot be properly operated when an impact is applied on the suspension system. And since twist elasticity cannot be adjusted according to the kind of the automobile in the static type of the stabilizer, the stabilizer is differently designed according to the kind of the automobile. Therefore many kind of stabilizer are needed to adapt every kind of automobile.

SUMMARY OF THE INVENTION

The object of the present invention is to provide a pneumatic type of stabilizer for an automobile, which can adjust the twist elasticity and can be adopted on every kind of automobile by simply adjusting the pressure of the air in the stabilizer.

The present invention to achieve the above object comprises a cylindrical case in which a left rotating rod and a right rotating rod having blade respectively are pivotally mounted, a rotator connected with the outer end of the rotating rod and which protruded out of the cylindrical case, a connecting rod connected with the end of the rotator, and two arms connecting the connecting rod with a suspension arm of a suspension system.

The stabilizer for an automobile in accordance with the present invention uses the pressurized air as elastic means to return the body of the automobile, when the automobile drives on the corner and tilted toward a side.

Furthermore the stabilizer can be adopted in every kind of automobile by controlling the elasticity of the pressurized air. And the elasticity of the air can be adjusted by controlling the amount of air injected into the cylindrical case When the automobile drives on the corner and tilted toward a side, the blades compresses the air in the cylindrical case between the both blades. Then the compressed air reacts the blades to return the body of the automobile to the original position.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PRESENT INVENTION

Figure 1:
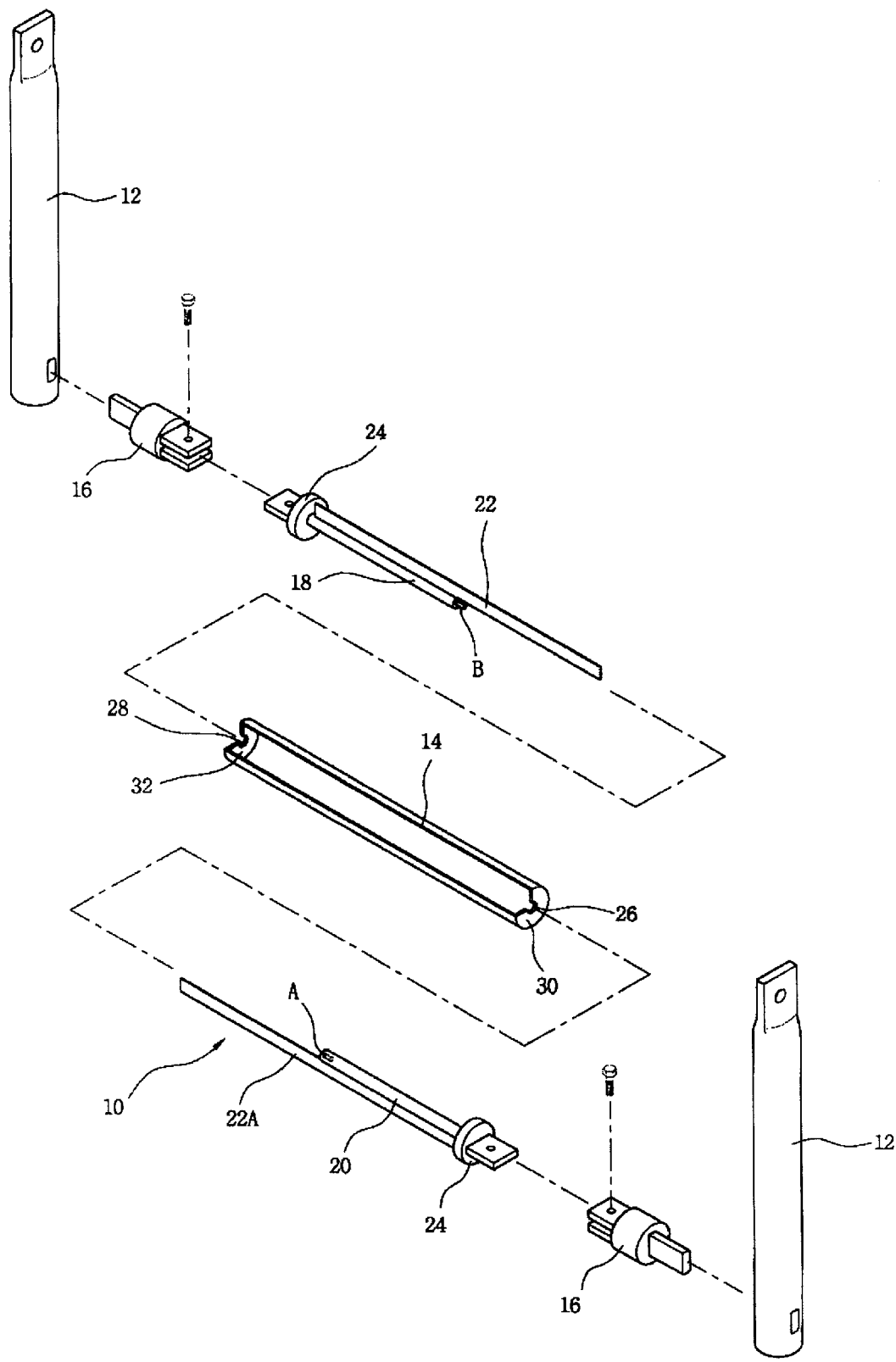
FIG. 1 is a disassembled perspective view of a stabilizer in accordance with the present invention.
Figure 2:
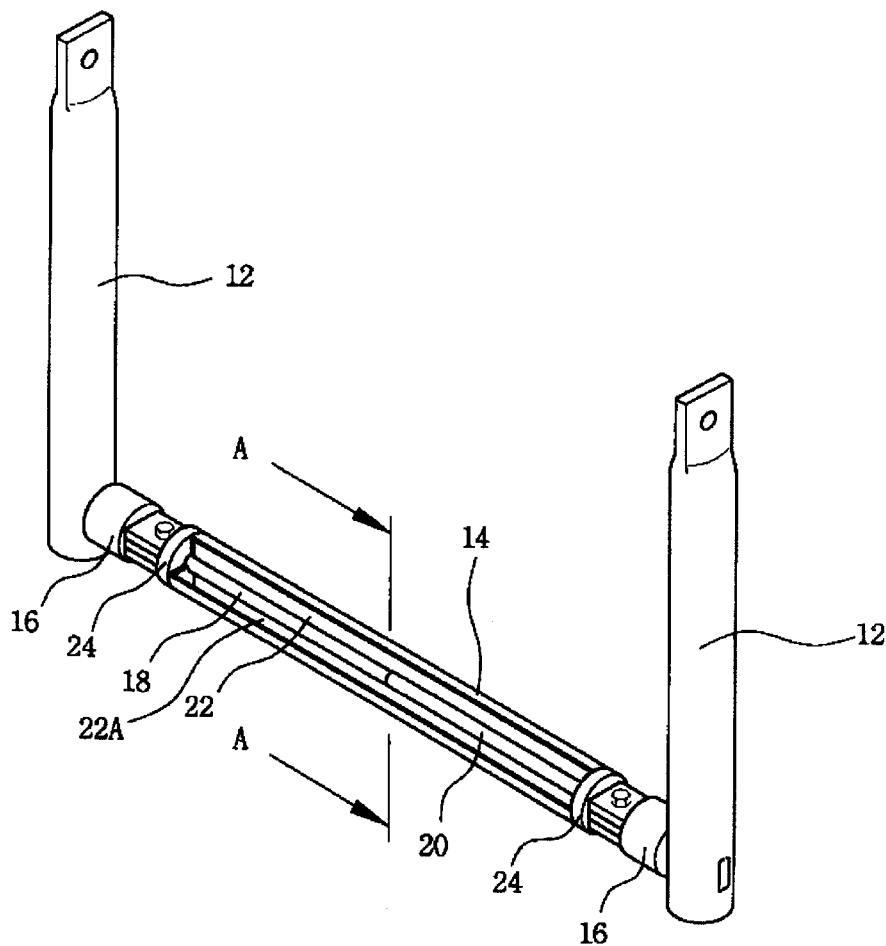
FIG. 2 is assembled perspective view of a stabilizer in accordance with the present invention.

FIG. 1 and FIG. 2 show an embodiment of a pneumatic type of stabilizer in accordance with the present invention. The stabilizer comprises a cylindrical case 14 in which a left rotating rod 18 and a right rotating rod 20 having blade 22 and 22A respectively are pivotally mounted, a rotator 24 connected with the outer end of the rotating rods 18 and 20 which protruded out of the cylindrical case 14, a connecting rod 16 connected with the end of the rotator 24, and two arms 12 connecting the connecting rod 16 with a suspension arm of a suspension system.

As shown in FIG. 1, one of the rotating rods 18 and 20 has a recess A in its end and the remained rotating rod 18 or 20 has a pin B in the opposite end. The left rotating rod 18 and the right rotating rod 20 are pivotally combined in middle position of the cylindrical case 14 each other through the recess A and the pin B as shown in FIG. 2 and FIG. 3.

Figure 3:
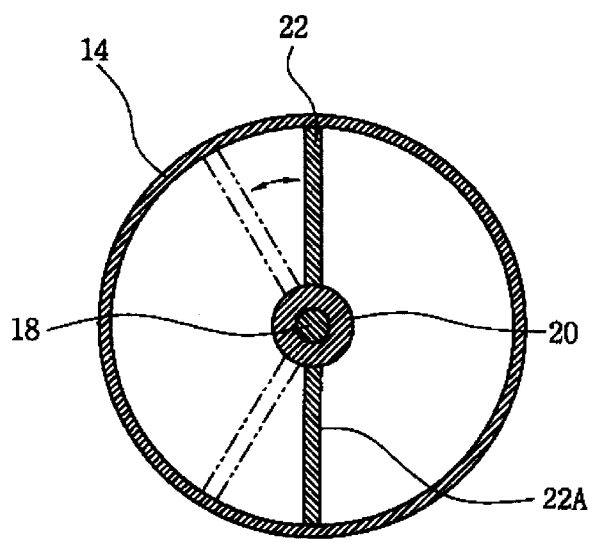
FIG. 3 is a cross section view taken along the line A—A in FIG. 2.

The blades 22 and 22A fixed on the rotating rods 18 and 20 respectively are arranged along the whole length of the cylindrical case 14 and positioned oppositely in order to divide the inner space of the cylindrical case 14 into two portions along the diameter of the cross section of the cylindrical case 14 as shown in FIG. 3. Then the outer end of the blades 22 and 22A can slide along the inner surface of the cylindrical case 14 and air tightly contacted with the inner surface of the cylindrical case 14.

Holes 26 and 28 are pierced on the both end walls 30 and 32 of the cylindrical case 14. The rotating rods 18 and 20 are pivotally and air tightly inserted into the hole 26 and 28 respectively.

Air is compressed into the inner space of the cylindrical case 14 provided the blades 22 and 22A and the rotating rods 18 and 20. Therefore the inner space of the cylindrical case 14 is kept at high pressure with the compressed air and the two blades 22 and 22A are straightly expanded as shown in FIG. 3 at normal state, for example while the automobile drives on the plane road.

When the automobile providing the stabilizer in accordance with the present invention drivers on the road, the left suspension system and the right suspension system respectively mounted on the both side wheels of the automobile are vertically moved according to the condition of the road.

When the automobile drives on the corner, the automobile is tilted to the one side. As the result of that, the vertical movement of the left suspension system and the right suspension system get different each other. That is, one of the suspension systems moves upwardly and the other suspension system is moves downwardly.

The vertical movement of the suspension system is changed into the rotating movement while the movement of the suspension system is transmitted to the arm 12.

The rotating movement of the arm 12 is transmitted to the connecting rod 24 through the rotator 16, and the connecting rod 24 turns the rotating rods 18 and 20 and the blades 22 and 22A.

At this time, each of the rotating rods 18 and 20 is pivoted about the recess A and the pin B to the different direction as shown in FIG. 3 with dot line.

Therefore the rotating blades 22 or 22A compresses the air between the both blades 22 and 22A in the cylindrical case 14. On the other hand, the air in the other inner space of the cylindrical case 14 is expanded.

At this time, the compressed air pushes the rotating blades 22 and 22A backward and the returning blades 22 and 22A compress the other inner space of the cylindrical case 14 instantaneously.

The above actions are repeated many times for short time and the amplitude of the blades 22 and 22A become to be decreased. And finally the blades 22 and 22A is stopped. Therefore the left arm and right arm 12 connected with the blades 22 and 22A through the connecting rod 24 and the rotator 16 is in equilibrium and the body of the automobile returns to the plane state.

Furthermore, a check valve and a nozzle can be provided with the cylindrical case 14 for controlling the amount of the air injected into the cylindrical case 14. The pressure in the cylindrical case 14 can be adjusted by controlling the amount of the air in the cylindrical case 14.

The stabilizer in accordance with the present invention can be adapted to the every kind of the automobile by adjusting the pressure in the cylindrical case 14.

As described above, since the stabilizer for an automobile in accordance with the present invention uses the pressurized air to return the body of the automobile to the equilibrium state when the automobile is tilted on driving the corner, the passenger of the automobile can get a good ride quality.

Next, by changing the amount of the air injected into the cylindrical case 14 the elasticity of the stabilizer in accordance with the present invention can be easily controlled. Therefore one type of the stabilizer in accordance with the present invention can be applied to the every kind of the automobile.

What is claimed is:

1. A pneumatic type of stabilizer for an automobile comprising:

a cylindrical case in which a left rotating rod and a right rotating rod, each having a radial blade, respectively, are pivotally mounted, said radial blades on the left and right rotating rods, respectively, are arranged along the whole length of the cylindrical case, a rotator connected with each of an outer end of the respective left and right rotating rod, the outer ends protruding out of the cylindrical case, a connecting rod connected with an end of the rotators, and two arms connecting the connecting rods with a suspension arm of a suspension system.

2. A pneumatic type of stabilizer for an automobile according to claim 1, wherein the left rotating rod and the right rotating rod are pivotally coupled in a middle position of the cylindrical case.

3. The pneumatic type of stabilizer according to claim 1 wherein the radial blades are normally positioned oppositely in order to divide the inner space of the cylindrical case in two portions along the diameter of the cross section of the cylindrical case.

* * * * *